United States Patent

[11] 3,601,314

| [72] | Inventor | Arthur A. Hurt |
| | | 1608 E. 4th Ave., Spencer, Iowa 51301 |
| [21] | Appl. No. | 852,726 |
| [22] | Filed | Aug. 25, 1969 |
| [45] | Patented | Aug. 24, 1971 |

[54] SPRAYING APPARATUS WITH CONFINING SHIELD
6 Claims, 5 Drawing Figs.

[52] U.S. Cl. ............................................... 239/157, 239/288.5, 222/177
[51] Int. Cl. ............................................. B05b 9/06
[50] Field of Search ...................................... 239/157, 158, 156, 155, 172, 288.5; 222/177

[56] References Cited
UNITED STATES PATENTS

| 1,387,352 | 8/1921 | Clark | 239/157 X |
| 1,751,039 | 3/1930 | Janssen et al. | 239/157 |
| 1,837,127 | 12/1931 | Kirton | 239/158 |
| 2,048,063 | 7/1936 | Friedman | 239/157 |
| 2,491,818 | 12/1949 | Lapp | 239/157 |
| 2,518,771 | 8/1950 | Gol | 239/172 X |
| 2,721,437 | 10/1955 | Greenluno | 239/157 X |
| 2,740,664 | 4/1956 | Yates | 239/172 X |
| 3,512,714 | 5/1970 | Phelps et al. | 239/172 X |

*Primary Examiner*—M. Henson Wood, Jr.
*Assistant Examiner*—John J. Love
*Attorneys*—Clarence A. O'Brien and Harvey B. Jacobson ABSTRACT: A wheel-mounted housing having an open underside confronting a supporting surface to be treated with material. A pump is mounted to the housing and a crank and pitman assembly connect one wheel to the pump to cause operation thereof. A storage tank with treating material is connected to the housing and conduit means provides passage of material from the tank to the pump. The output of the pump is connected to a spraying nozzle toward the supporting surface upon which the wheeled housing rides.

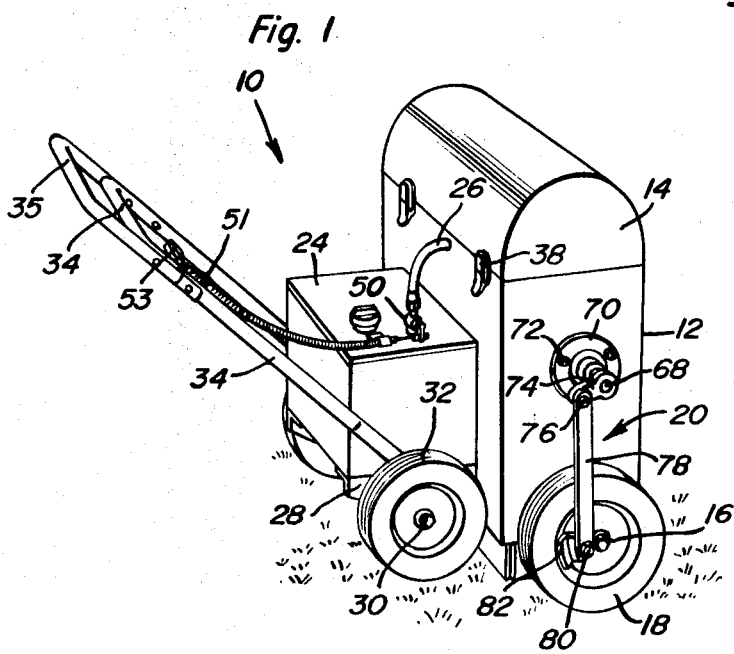
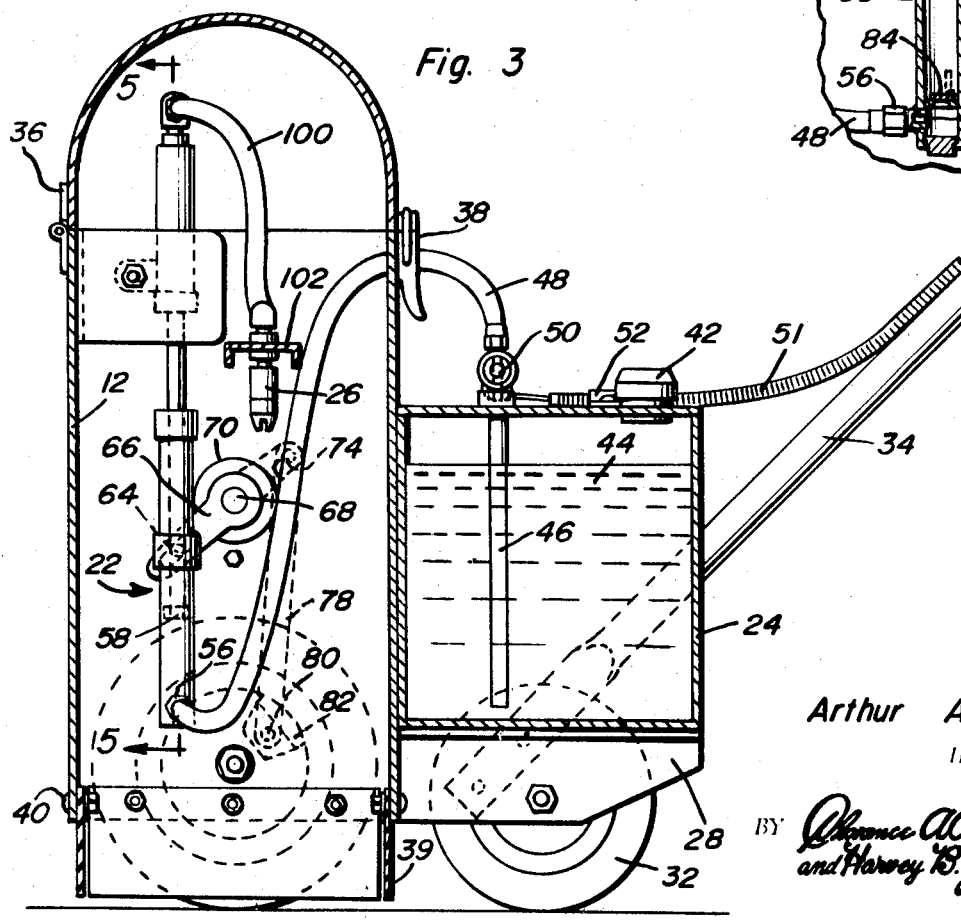

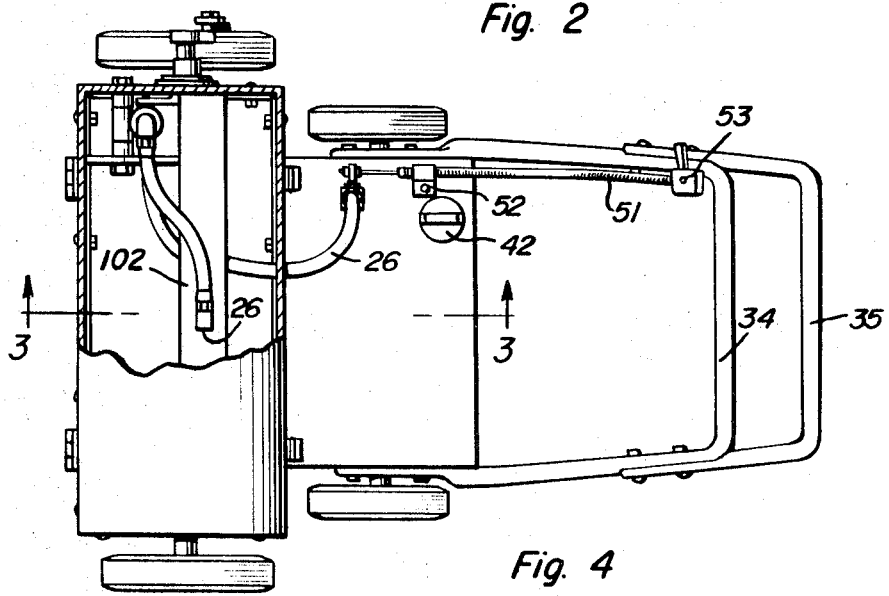
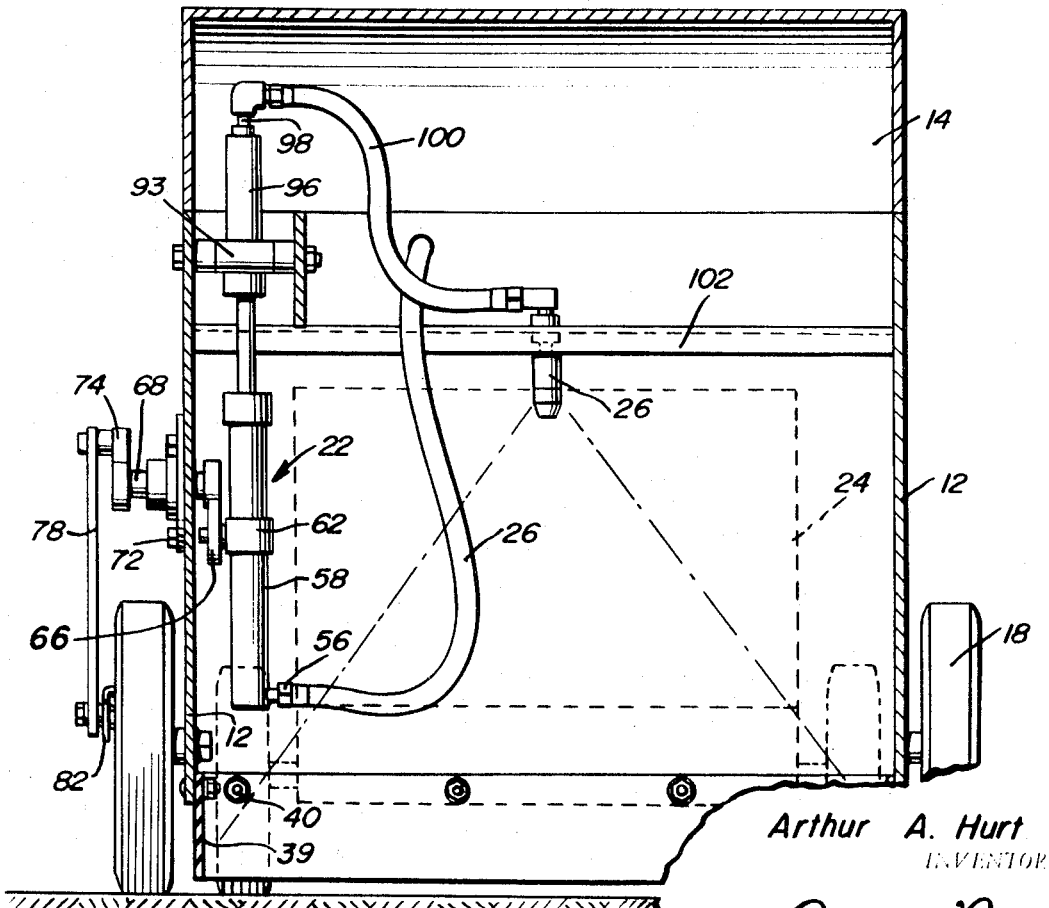

SPRAYING APPARATUS WITH CONFINING SHIELD

In the past, a large variety of spraying apparatus have been constructed for the purpose of treating lawns, golf courses, and other grass surfaces. In a typical construction, the spraying apparatus is supplied with weed killer which is caused to be sprayed over a grass surface as the apparatus is wheeled around. However, in the past, available constructions have left spraying nozzles exposed so that a peripheral portion of the spraying zone may overlap shrubbery, flowers or other susceptible vegetation which are injured by the treating material. Further, prior devices have generally included electrical or gasoline driven motors which in turn drive pumps. Although these mechanisms provide convenience they are generally too expensive for a substantial part of the market that could benefit by such a device. Further, such power-driven models require maintenance and are subject to rapid mechanical deterioration.

The present invention includes a wheel-mounted housing to which is attached a tank particularly adapted to store weed killer and the like. A pump is disposed in the housing and is connected to the tank which supplies the pump with spraying material. The output of the pump is connected to a nozzle which directs a spray of the treating material downwardly through an opening in the housing for contact with a grass surface. It will be noted that the housing itself forms a shield for confining the spraying zone to an area immediately overlying the housing opening. A crank and pitman assembly is connected between one of the wheels and the pump for causing operation of the pump as the wheeled housing transverses the grass. The construction of the present invention is simple, rugged and offers the user an economic advantage which is not realizable with complicated power-driven spraying apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the spraying apparatus which is the present invention.

FIG. 2 is a top cutaway view of the spraying apparatus shown in FIG. 1.

FIG. 3 is a transverse sectional view taken along a plane passing through section line 3—3 of FIG. 2.

FIG. 4 is a front sectional view of the present invention illustrating the interior components thereof.

FIG. 5 is a partial sectional view showing the structure of a typical pump for use with the present invention.

Referring to the drawings and more particularly FIG. 1 thereof, reference numeral 10 generally indicates the spraying apparatus of the present invention. As will be seen from the figure, the apparatus includes an upright housing 12 having a semicylindrical lid 14 mounted thereto. The basic structure of the apparatus includes an axle 16 disposed between lateral walls of housing 12 for mounting a wheel 18 thereto. The wheel 18 serves as a prime mover when the apparatus is manually pushed. A pump generally indicated by reference numeral 22 (FIG. 3) is enclosed within housing 12 and is caused to be operated by a crank and pitman assembly indicated by 20 in FIG. 1. The assembly is linked at one end thereof to wheel 18 and translates motion to the actuating portion of the pump as hereinafter described. The pump 22 pumps treating material from a tank 24 mounted on a lateral wall of the housing 12, as seen in FIG. 1. A flexible hose 26 is disposed between the tank 24 and the pump 22 to serve as a material conduit therebetween. Two parallel-spaced angle irons 28 are connected at aligned transverse ends thereof to the housing 12 and along the upper surface thereof to the underside or base of tank 24. Thus, tank 24 and housing 12 are rigidly secured or connected together. A second axle 30 is rotatably mounted between the angle irons 28 and serve to mount a second pair of wheels 32 thereon. This second wheel appears normally adapted to ride along a supporting surface as seen in FIG. 3. However, if during transportation of the device, rapid travel is desired, the housing may be tilted backwardly onto wheels 32 so that the previously mentioned wheels 18 become freed from ground engagement. This permits rapid wheeling of the apparatus without expending additional energy required to drive the crank and pitman assembly 20 and without actuating the pump.

As will be observed in the figures, a handle bar 34 is secured at the lower free ends thereof to the parallel spaced angle irons. In order to rigidify the handle bar 34, a U-shaped tubular member or bridge 35 is secured at the free ends thereof to the upper portion of handle bar 34.

Referring to the apparatus in greater detail, reference is made to FIG. 3 illustrating the utilization of a piano hinge 36 for connecting the housing 12 to the semicylindrical lid 14. Conventional luggage-type locks 38 may be employed to retain the lid in place.

Referring to FIGS. 3 and 4, a rectangular skirt or shield 39 will be seen to be disposed in concentric relation with the lower open end portion of housing 12 and secured to the lower edge thereof by suitable fasteners 40. The lower edge of the shield 39 is adapted to be located immediately above the ground surface so that discharge through the shield is restricted or confined to an area substantially equal to the cross-sectional area of the shield.

Viewing FIGS. 1 and 3, the supply tank 24 will be seen to include a removably plugged filling hole 42 which allows the introduction of treating material 44 into the tank. A siphon tube 46 is disposed in the interior portion of the tank and passes upwardly therethrough for connection with a flexible hose 48 through a metering valve 50. As will be seen in FIG. 1, a Bowden wire or flexible cable 51 is connected at a lower end thereof to the valve 50 while the upper end of the cable terminates in a lever adjustment control 53 for permitting remote adjustment of metering valve 50. The cable is secured to the upper side of tank 24 by a clamp 52. As will be noted in FIG. 1, the adjusting lever 53 is attached to the handle bar 34 thereby allowing the user to control the lever adjustment while he pushes the apparatus.

Referring again to FIG. 3, the flexible tube or hose 48 will be seen to terminate at the second end thereof in a pump inlet coupling 56, disposed at the lower end of a first pump portion 58. It will be noted that pump 22 is of the simple reciprocating type but other types of conventional pumps are contemplated and may be used as substitutes by those knowledgeable in the art. The inlet coupling 56 communicates with an inlet orifice 60 in the pump portion 58 which allows the introduction of treating material from the hose 48 therein.

Referring to FIGS. 3 and 5, a collar 62 is fixedly attached to an intermediate point along the pump section 58. The collar in turn is connected to a crankpin 64 which rides within the loop head of a crank arm 66 which is axially mounted to a rotating shaft 68. These crank elements form a portion of the crank and pitman assembly previously referred to by reference numeral 20. The shaft 68 is axially maintained in a journal 70 having an annular flange secured to an associated lateral wall of housing 12 by suitable fasteners 72. The outward end of shaft 68 mounts a second crank arm 74 which in turn is connected to a pitman arm 78 through a pin 76. The lower end of the arm 78 is pivotally connected by a pin 80 to a mounting flange 82 secured to the rim of wheel 18. Thus, as wheel 18 rotates when the apparatus 10 is pushed, the pitman arm 78 reciprocates upwardly and downwardly to cause the crank arms 66 and 74 to oscillate over an angular displacement approximating 90°. As will be seen in FIG. 3 this substantially vertical oscillation causes the pump portion 58 to reciprocate with respect to the fixed pump portion as explained hereinafter. A check valve 84 is disposed in the lower end of pump portion 58 so that unidirectional flow of treating material into the pump is effected. The upper end of pump portion 58 is threaded to receive an axially apertured cap 86 having a seal 88 therein to cause the sealing of the pump portion 58 relative to a vertically elongated hollow piston member 90. The lower end of the piston member terminates in a cup 91 which compresses the contents in the pump portion 58 serving as a cylinder. After sufficient compression of the contents, flow will be effected upwardly through the piston tube 90 and into an upper chamber 96 having a lower intake end threadingly connected to the piston member 90 in a coupling or fitting 92. An intermediate point along the length of the upper chamber 96 is connected to a flange-mounted hinge or rotatable pivot 93 which allows for the resultant pivotal motion of chamber 96 during reciprocating action of the cylinder portion 58. Compressed flow of treating material continues through the upper chamber 96 and into flexible delivery hose 100 through a fitting 98. FIGS. 3 and 4 clearly illustrate disposition of the opposite end of delivery pipe 100 into the aforementioned conventional nozzle 26 which is stationarily secured within the housing by an elongated flange 102 that extends between oppositely disposed lateral walls in the housing. The nozzle is mounted at a vertical point in the housing so as to cause the generation of a spray sufficiently dispersed to cover the cross-sectional area of the lower confining shield or skirt 39.

Thus, in operation of the device, as the apparatus 10 is pushed across a grass surface, wheel 18 causes the crank and pitman assembly 20 to reciprocally operate pump 22 causing the downward dispensing of treating material from nozzle 26. The lower shield 39 is maintained at a point slightly above the grass surface so that the spraying zone is not appreciably extended beyond the border of the traversing shirt. This protects shrubbery and other foliage immediately adjacent the path of the travelling apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spraying apparatus comprising a housing having a shielded opening therein directed downwardly for confining the spray zone of a confronting surface to be treated, said shielded opening being defined by a plurality of substantially vertical shield portions at the lower edge of said housing and adapted to be located immediately above the ground, a first set of wheels connected with the housing, a tank connected with the housing for containing treating material, a pump connected with the housing for pumping the material and including a stationary portion and a reciprocating portion, flexible hose means connecting the tank to the reciprocating portion of the pump, a crank assembly connected between said first set of wheels and the reciprocating portion of the pump for operating the pump as the housing travels along a supporting surface, a nozzle disposed in the shielded housing and being directed downwardly toward the confronting supporting surface, and conduit means connecting the pump output to the nozzle to generate a spray of material directed toward the surface when the housing travels along the surface.

2. The device as set forth in claim 1, together with support means extending back from the housing, and a second set of wheels connected with said support means and spaced behind said first set of wheels.

3. The device as set forth in claim 2, together with handle means connected to said support means for pushing the device forward with the first set of wheels engaging the ground or with the first set of wheels disengaged from the ground and thereby reducing the force necessary to push the device forward.

4. The device as set forth in claim 3, together with adjustable valve means disposed in line with the house means, and remote control means for adjusting the regulating condition of the valve means.

5. The device as set forth in claim 4, wherein said remote control means is mounted on said handle means to permit convenient adjustment by the operator.

6. The device as set forth in claim 1, wherein said crank assembly includes an arm, means pivotally mounting one end of the arm to the first set of wheels, a first crank handle, means pivotally mounting the free end of the arm to the crank handle, a rotating shaft passing through the housing and secured at the outer end thereof to the first mentioned crank handle, a second crank handle secured to the inward end of the rotating shaft, the second crank handle including a loop head therein, a collar fixedly attached to the reciprocating portion of the pump, a crankpin extending outwardly from the collar and through the loop head to effect rotational displacement therein whereby the pump can be caused to reciprocate resulting in the pumping of material therethrough.